US00RE46640E

(19) United States
(12) Reissued Patent
Aarni et al.

(10) Patent Number: US RE46,640 E
(45) Date of Reissued Patent: Dec. 19, 2017

(54) METHOD FOR IMPROVING RHEOLOGICAL PROPERTIES OF AN AQUEOUS PIGMENT SLURRY AND A DISPERSION AGENT

(71) Applicant: Kemira Oyj, Helsinki (FI)

(72) Inventors: Esko Aarni, Espoo (FI); Perttu Heiska, Espoo (FI); Kimmo Huhtala, Turku (FI)

(73) Assignee: KEMIRA OYJ, Helsinki (FI)

(21) Appl. No.: 15/143,679

(22) Filed: May 2, 2016

Related U.S. Patent Documents

Reissue of:
(64) Patent No.: 9,145,504
Issued: Sep. 29, 2015
Appl. No.: 14/296,927
Filed: Jun. 5, 2014

U.S. Applications:
(63) Continuation of application No. 12/493,660, filed on Jun. 29, 2009, now Pat. No. 8,785,550.

(30) Foreign Application Priority Data

Dec. 18, 2008 (FI) ..... 20086214

(51) Int. Cl.
*C09D 7/02* (2006.01)
*C09D 17/00* (2006.01)
*D21H 19/58* (2006.01)
*C08K 3/26* (2006.01)

(52) U.S. Cl.
CPC ..... *C09D 17/004* (2013.01); *C09D 7/02* (2013.01); *C09D 17/001* (2013.01); *D21H 19/58* (2013.01); *C08K 2003/265* (2013.01)

(58) Field of Classification Search
CPC ..... C09D 17/004
See application file for complete search history.

(56) References Cited

U.S. PATENT DOCUMENTS

| | | | | |
|---|---|---|---|---|
| 3,942,995 | A | 3/1976 | Ichikawa et al. | |
| 4,384,069 | A | 5/1983 | Wendel et al. | |
| 4,474,860 | A | 10/1984 | Van Gilder et al. | |
| 5,139,614 | A | 8/1992 | dePierne | |
| 5,145,902 | A * | 9/1992 | Ravet | C01F 11/185 524/425 |
| 6,114,417 | A | 9/2000 | O'Toole et al. | |
| 6,426,381 | B1 | 7/2002 | Konig et al. | C08F 212/08 524/734 |
| 6,734,232 | B2 | 5/2004 | Hagiopol | |
| 8,785,550 | B2 * | 7/2014 | Aarni et al. | 524/734 |
| 2003/0188665 | A1 | 10/2003 | Sano et al. | |
| 2005/0261394 | A1 | 11/2005 | Branston et al. | |
| 2006/0013724 | A1 | 1/2006 | Dietsche et al. | |
| 2007/0249758 | A1 | 10/2007 | Suau et al. | |
| 2008/0210394 | A1 | 9/2008 | Mahr et al. | |
| 2009/0326118 | A1 | 12/2009 | Inoue et al. | |
| 2009/0326127 | A1 | 12/2009 | Idemura et al. | |

FOREIGN PATENT DOCUMENTS

| | | | |
|---|---|---|---|
| CN | 101300311 | * | 5/2008 |
| EP | 0784119 | | 7/1997 |
| EP | 0784119 | A1 | 7/1997 |
| JP | 63120194 | A | 5/1988 |
| JP | H07-237357 | | 9/1995 |
| JP | 63120194 | | 5/1998 |
| JP | 2004003118 | | 1/2004 |
| JP | 2004003118 | A | 1/2004 |
| JP | 2005-502208 | | 1/2005 |
| JP | 2006-502208 | | 1/2006 |
| JP | 2006037316 | | 2/2006 |
| JP | 2006037316 | A | 2/2006 |
| JP | 2006091203 | | 4/2006 |
| JP | 2006091203 | A | 4/2006 |
| JP | 2006265748 | | 10/2006 |
| JP | 2006265748 | A | 10/2006 |
| JP | 2007332512 | | 12/2007 |
| JP | 2007332512 | A | 12/2007 |
| JP | 2008507390 | A | 3/2008 |
| JP | 2008507390 | | 4/2008 |
| JP | 2008542563 | | 11/2008 |
| RU | 2230085 | | 6/2004 |
| RU | 2230085 | A | 6/2004 |
| RU | 2245952 | | 2/2005 |
| RU | 2245952 | A | 2/2005 |
| WO | 02084028 | | 10/2002 |
| WO | 03029560 | | 4/2003 |
| WO | WO2004078807 | | 9/2004 |
| WO | 2004099499 | | 11/2004 |
| WO | 2007085553 | | 8/2007 |
| WO | WO 2007085553 | A1 * | 8/2007 |

OTHER PUBLICATIONS

Russian Office Action dated Dec. 17, 2013; 5 pages; Russian Patent Office.
European Office Action dated Apr. 11, 2012; Application No. 09796406.8-1217.
International Search Report; International Application No. PCT/FI2009/051013; International Filing date Dec. 18, 2009; 4 pages.
Japanese Office Action dated Aug. 20, 2013; Prepared by Tsutomu Nishina; English Translation included.
JP 58115196 Abstract, 5 pages, Jul. 1983.

* cited by examiner

*Primary Examiner* — Timothy J Kugel
(74) *Attorney, Agent, or Firm* — Thomas Horstemeyer, LLP

(57) ABSTRACT

The invention relates to a method for improving rheological properties of an aqueous pigment slurry. In the method dispersion agent is added to an aqueous phase of a slurry comprising pigment particles or to the aqueous phase into which the pigment particles are to be added. The dispersion agent comprises styrene acrylate copolymer. The invention relates also to dispersion agent for a pigment slurry comprising a first component comprising styrene acrylate copolymer and a second component comprising a conventional dispersion agent, such as a straight-chain polyacrylate.

5 Claims, No Drawings

METHOD FOR IMPROVING RHEOLOGICAL PROPERTIES OF AN AQUEOUS PIGMENT SLURRY AND A DISPERSION AGENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation application of U.S. patent application Ser. No. 12/493,660, filed Jun. 29, 2009, which claims priority to Finnish Application 20086214, filed Dec. 18, 2008, both of which are hereby incorporated by reference in their entirety.

The present invention relates to a method for improving rheological properties of aqueous pigment slurry according to the preamble of the enclosed independent claim. The invention relates also to dispersion agent and to use of styrene acrylate copolymer.

Paper and paperboard are coated with different coating colors in order to improve, among other things, the strength, printability and appearance of the paper, e.g., smoothness and gloss. During the coating process an aqueous solution of coating composition is applied to one or both sides of paper. Conventional coating compositions comprise mainly pigment and binder, and possible other additives, such as co-binders, preservatives, dispersion agents, defoaming agents, lubricants, hardeners and optical brighteners. The main ingredient of the coating color is pigment particles.

There exist a number of different pigments. Usually they are various minerals by their origin, kaolin clay and calcium carbonate being the most common.

Some of the pigments must be subjected to so-called grinding operation, where the size of the pigment particles is reduced via an input of energy, in order to adapt the particle size distribution of the particles to the intended application. For example calcium carbonate and gypsum are subjected to grinding before they are used in the paper coating compositions. Usually the grinding is performed as wet grinding, and one or several grinding agents are added during the process. In most of the grinding processes, in the last process step the size of the pigment particles does not essentially change, but a dispersion agent is added to the pigment slurry in order to stabilize it.

Some of the pigments do not require grinding as they are readily obtained with suitable particle size for paper coating compositions. Examples of such pigments are precipitated calcium carbonate and kaolin. These pigments are directly slurried with water, into which is usually added dispersion agent.

Same dispersion agents can be used in both processes. Dispersion agents may have an impact on rheological properties of the obtained slurry. The rheological properties of the pigment slurries and coating compositions are important for their usability. For handling of the slurries, e.g. during pumping and mixing, the low-shear properties are important, while the high shear properties of coating compositions are important for good coating runnability during application of the coating to the paper. The high shear properties of a coating composition are directly comparable with the high shear properties of the pigment slurry that is used for preparing it. It would be a great advantage to be able to modify the rheological properties of the pigment slurries in order to optimize the rheological properties of coating compositions used in coating processes of paper and/or board.

When conventional dispersion agents are used, the rheological properties of the pigment slurries are not improved by increasing the dosage of the dispersion agent over the normal dispersion dosage levels. In other words, increasing the dosage of a conventional dispersion agent over the amount that is needed for dispersing of the pigment particles does not notably affect the rheological properties of the obtained slurry.

An object of this invention is to minimize or possibly even eliminate the disadvantages existing in the prior art.

An object is also to provide a method for improving the rheological properties of pigment slurry.

A further object of this invention is also to provide a dispersion agent with which rheological properties of a pigment slurry can be improved.

These objects are attained with a method and an arrangement having the characteristics presented below in the characterizing parts of the independent claims.

In typical method according to the present invention for improving rheological properties of an aqueous pigment slurry dispersion agent is added to an aqueous phase of a slurry comprising pigment particles or to the aqueous phase into which the pigment particles are to be added, the dispersion agent comprising styrene acrylate copolymer.

Typical dispersion agent according to the present invention for a pigment slurry comprises a first component comprising styrene acrylate copolymer, and a second component comprising a conventional dispersion agent, such as a straight-chain polyacrylate.

Typical use of styrene acrylate copolymer according to the present invention is as a dispersion agent in a pigment slurry for improving its rheological properties.

Now it has been surprisingly found out that by adding a dispersion agent comprising styrene acrylate copolymer to a pigment slurry the rheological properties of the slurry are unexpectedly improved at the same time as the other properties of the slurry are kept at least at the conventional level. Especially the addition of dispersion agent comprising styrene acrylate copolymer improves the high shear properties of the slurry, which consequently improves behavior of the slurry in paper coating compositions. It has also been found out that the increased dosage of such a dispersion agent has a positive impact on rheological properties of the slurry, i.e. the high shear viscosity of the slurry is decreased, compared to slurries with similar solids content without addition of dispersion agent comprising styrene acrylate copolymer.

Typical pigments that may be used in the present invention for preparation of pigment slurry are calcium carbonate, kaolin, calcinated kaolin, talc, titanium dioxide, gypsum, chalk, satine white, barium sulfate, sodium aluminum silicate, aluminum hydroxide or any of their mixture. Calcium carbonate may be ground calcium carbonate (GCC) or precipitated calcium carbonate (PCC) or their mixture. Preferably the pigment is calcium carbonate.

Typically the dispersion agent that is employed in the present invention comprises as a first component styrene acrylate copolymer that has been obtained by polymerizing styrene and acrylate monomers in presence of starch, as described later in the application. The dispersion agent may also comprise small amount of other constituents, such as unpolymerized monomers or other substances. The amount of other constituents is typically less than 5 weight-%, more typically less than 3 weight-%.

According to one embodiment of the present invention the dispersion agent comprising styrene acrylate copolymer may be added during the final stages of wet grinding of a pigment when the pigment particles have already obtained the desired particle size. The dispersion agent is added to the pigment slurry coming from the preceding process steps. The pigment slurry may comprise grinding agents that have been added under grinding steps preceding this last process step. Typical examples of such grinding agents are polyacrylates, such as Na- or K-polyacrylate, polyacrylate copolymers or mixtures thereof. Polyacrylate copolymers may be branched or straight chained. This process is especially useful when preparing pigment slurries of ground calcium carbonate (GCC), titanium dioxide or gypsum.

According to another embodiment of the present invention the dispersion agent comprising styrene acrylate copolymer may be added to the aqueous phase into which any suitable pigment in powder, paste or cake form, such as precipitated calcium carbonate or titanium dioxide, is added with suitable means, e.g. screw conveyor, and the final pigment slurry is obtained by mixing of the aqueous phase and pigment powder. This process is used for example when preparing pigment slurry from kaolin, titanium dioxide or pigments having needle-like particles.

Dispersion agent is usually added in such amount that the pigment slurry comprises at least 0.1 parts thereof per 100 parts pigment. Typically dispersion agent is added in such amount that the pigment slurry comprises 0.1-3.5, preferably 0.25-3.0, more preferably 0.05-2.5, most preferably 1.0-2.0 parts dispersion agent per 100 parts pigment. These amounts refer to the total amount of dispersion agent, the dispersion agent comprising only co-polymer or a mixture of co-polymer with other agents.

Also a conventional dispersion agent, such as straight-chain polyacrylate, may be added to the aqueous phase. According to one preferred embodiment of the invention the dispersion agent comprises a second component. The second component may be a conventional dispersion agent, such as polyacrylate, polyacrylate copolymer or their mixtures. In these cases the dispersion agent comprises a first component comprising styrene acrylate copolymer and a second component comprising conventional dispersion agent as described above. In this way the dispersion of the pigment particles in the slurry may be optimized and at the same time achieved improved rheological properties for the slurry. It is also possible to add a conventional dispersion agent as a separate input flow to the aqueous pigment slurry in addition to another separate input flow comprising styrene acrylate copolymer. This embodiment is suitable for processes where the dispersion agent is directly added to the aqueous phase into which the pigment is added in powder form.

When the dispersion agent comprises a second component comprising a conventional dispersion agent as described above, such as polyacrylate, the proportion first component to the second component is typically in the range 55:45-95:5, more typically 50:50-92.5:7.5, even 70:30-90:10. In some cases the proportion first component to the second component may be 99:1. According to one embodiment the proportion first component:second component is in the range 50:50-99:1, preferably 50:50-90:10.

According to one embodiment of the invention styrene acrylate copolymer is used as sole dispersion agent. In other words, it is not necessary to use other dispersion agents except styrene acrylate copolymer, for obtaining the desired stability for pigment slurry. If other dispersion agents are used, their dosage may be reduced from the conventional and still the stability of the slurry is kept at desired level.

The styrene acrylate copolymer that is used as dispersion agent in the present invention may be obtained by copolymerization of ethylenically unsaturated monomers. Suitable styrene monomers are styrene and substituted styrenes, such as α-methylstyrene or vinyltoluene or their mixtures, and suitable acrylate monomers are C1-C4-alkyl acrylates, C1-C4-alkyl methacrylates or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate, mixture of at least two isomeric butyl acrylates being preferred, mixtures of n-butyl acrylate and methyl methacrylate being particularly preferred. According to one most preferred embodiment of the invention the mixtures of n-butyl acrylate and tert-butyl acrylate are used in polymerization. For mixtures of two monomers the mixing ratio may be 10:90 to 90:10.

According to one preferred embodiment of the invention the styrene acrylate copolymer comprises starch. Preferably the styrene acrylate copolymer is obtained as described in U.S. Pat. No. 6,426,381, i.e. by free radical emulsion copolymerization of ethylenically unsaturated monomers in the presence of starch. Starch may be any suitable native starch, such as potato, rice, corn, waxy corn, wheat, barley or tapioca starch, potato starch being preferred. Starches having an amylopectin content >80%, preferably >95% are advantageous. Starch may be also modified, for example, anionized, cationized or degraded. Anionized starch comprises anionic groups, such as carboxylate or phosphate groups, whereas cationized starch comprises cationic groups, such as quaternized ammonium groups. Degree of substitution (DS), indicating the number of anionic/cationic groups in the starch on average per glucose unit, is typically 0.01-0.20. Amphoteric starches, comprising both anionic and cationic groups, may also be used in the preparation of the styrene acrylate copolymer. Degraded starch is obtained by subjecting the starch to oxidative, thermal, acidic or enzymatic degradation, oxidative degradation being preferred. Hypochlorite, peroxodisulfate, hydrogen peroxide or their mixtures may be used as oxidizing agents. Degraded starch has typically an average molecular weight (Mn) 500-10 000, which can be determined by known gel chromatography methods. The intrinsic viscosity is typically 0.05 to 0.12 dl/g, determined, for example, by known viscosimetric methods.

According to one embodiment of the invention it is possible to use, instead of starch any other polysaccharide, which contains a free hydroxyl group, such as amylose, amylopectin, carrageen, cellulose, chitosan, chitin, dextrines, guar gum (guarane) and other galactomannans, arabic gum, hemicellulose components, and pullulan, for obtaining styrene acrylate copolymer used in the present invention. Dextrin is more preferred of the polysaccharides listed, i.e. the styrene acrylate copolymer comprises dextrin.

The dispersion agent comprising styrene acrylate copolymer may be used in form of aqueous polymer dispersion having a solids content of 10-50%, preferably 20-50%, more preferably 25-45%, most preferably 30-40%.

According to one embodiment of the invention the mean particle size of the styrene acrylate copolymer is 20-300 nm, preferably less than 150 nm when it is used as dispersion agent. According to one embodiment of the invention the mean particle size of the dispersion agent in the aqueous dispersion is in the range 20-150 nm, preferably 40-100 nm, more preferably 50-90 nm. The particle size of the dispersion agent may be determined by using a Malvern Zetamaster. It is speculated, without being bound by the theory, that the small particle size of the styrene acrylate copolymer might be beneficial for attaining the improved high shear viscosity values.

In this application and in the example the composition of the pigment slurry is given, if not otherwise stated, as conventional in the art, by giving the total amount of pigments value 100, and calculating the amounts of other components relative to the amount of the total pigment. Proportions of all components are given as dry parts.

EXAMPLE 100 parts of dried undispersed PCC (precipitated calcium carbonate, 95%<1 μm) is added into water with 0.55 pph (parts per 100) conventional Na-polyacrylate dispersant, Colloid 220 (trademark) by Kemira, to the solid content of the slurry 68%. The pH is adjusted to the value 9.9 or 9.5 (sample 4) using 10% sodium hydroxide. The slurry is mixed 10 minutes at ambient temperature in Diaf-mixer at 3000 rpm, after which 1 pph of dispersion agent according to the present invention is added for formulations 2 to 4. The mixing of the slurry is continued for further 5 minutes. From the prepared slurries viscosities are measured using Brookfield viscometer, type DV-II, with speeds 100 and 50 rpm and using spindle 3. The sample size was 500 g of dry pigment, solid content of the slurry ca 68%. High shear viscosity at shear blocking is measured using Hercules Hi-Shear DV-10 rotational viscometer. The test procedure of evaluating the viscosity of slurry pigments is as outlined by TAPPI (Technical Association of the Pulp and Paper Industry) test method T-648 (valid in September 2008). Results are shown in table 1

Dispersion agent in the samples is as follows:

Reference: pigment slurry with 0.55 pph Na-polyacrylate

Sample 2: pigment slurry with 0.55 pph Na-polyacrylate+1 pph styrene acrylate copolymer Sample 3: pigment slurry with 0.55 pph Na-polyacrylate+1 pph 90/10 styrene acrylate copolymer/Na-polyacrylate Sample 4: pigment slurry with 0.55 pph Na-polyacrylate+1 pph Na-polyacrylate In other words, samples 2 and 3 are according to the present invention, in reference sample and sample 4 employ conventional dispersion agent in different amounts.

TABLE 1

Results of viscosity measurements

| Measured Property | Unit | Reference | Sample 2 | Sample 3 | Sample 4 |
|---|---|---|---|---|---|
| Viscosity, Brookfield 100 rpm | mPas | 115 | 103 | 124 | 131 |

TABLE 1-continued

Results of viscosity measurements

| Measured Property | Unit | Reference | Sample 2 | Sample 3 | Sample 4 |
|---|---|---|---|---|---|
| Viscosity, Brookfield 50 rpm | mPas | 132 | 141 | 164 | 173 |
| High shear viscosity at shear blocking | mPas | 95 | 85 | 63 | 101 |
| Solids content | % | 68.2 | 68.1 | 68.1 | 68.3 |
| pH | | 9.9 | 9.9 | 9.9 | 9.5 |
| Temperature | ° C. | 24 | 24 | 24 | 24 |
| Density | $g/cm^3$ | 1.84 | 1.84 | 1.84 | 1.84 |

From the results it can be seen that when a dispersion agent according to the present invention comprising styrene acrylate copolymer is used, the high shear viscosity at shear blocking decreases compared to slurries with conventional Na-polyacrylate dispersant.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for preparing an aqueous [pigment] slurry *of pigment particles* with improved rheological properties, where the pigment is selected from calcium carbonate, kaolin, calcinated kaolin, talc, titanium dioxide, gypsum, chalk, satine white, barium sulfate, sodium aluminum silicate, aluminum hydroxide or any of their mixture, the method comprising adding a dispersion agent in *an* amount of 0.1-3.5 parts per 100 parts of pigment to an aqueous phase of a slurry comprising pigment particles or to the aqueous phase into which the pigment particles are to be added,

*wherein* the dispersion agent [comprising] *comprises* styrene acrylate copolymer which is obtained by polymerizing styrene and acrylate monomers in presence of starch and which has a mean particle size in the aqueous dispersion in the range of 20-150 nm.

2. The method according to claim 1, wherein the dispersion agent comprising styrene acrylate copolymer is added during the final stages of wet grinding of a pigment when the pigment particles have already obtained the desired particle size.

3. The method according to claim 1, further comprising adding a conventional dispersion agent to the aqueous phase.

4. The method according to claim 3, wherein the conventional dispersion agent is a straight-chain polyacrylate.

5. The method according to claim 1, wherein the dispersion agent comprising the styrene acrylate copolymer is used in the form of an aqueous polymer dispersion having a solids content of 10-50%.

* * * * *